US008669405B2

(12) United States Patent
Ramirez Corredores et al.

(10) Patent No.: US 8,669,405 B2
(45) Date of Patent: Mar. 11, 2014

(54) STABLE BIO-OIL

(75) Inventors: Maria Magdalena Ramirez Corredores, Houston, TX (US); Vicente Sanchez, Houston, TX (US); Xiaowei Tong, Houston, TX (US)

(73) Assignee: KiOR, Inc., Pasadena, TX (US)

( * ) Notice: Subject to any disclaimer, the term of this patent is extended or adjusted under 35 U.S.C. 154(b) by 447 days.

(21) Appl. No.: 13/025,550

(22) Filed: Feb. 11, 2011

(65) Prior Publication Data
US 2012/0204481 A1 Aug. 16, 2012

(51) Int. Cl.
*C10L 1/04* (2006.01)

(52) U.S. Cl.
USPC ............... 585/240; 585/14; 585/242; 44/300

(58) Field of Classification Search
USPC ......................................... 585/14, 240, 242
See application file for complete search history.

(56) References Cited

U.S. PATENT DOCUMENTS

| | | | |
|---|---|---|---|
| 4,209,647 A | 6/1980 | Gallivan et al. | |
| 4,645,585 A | 2/1987 | White | |
| 5,820,640 A | 10/1998 | Ikura et al. | |
| 7,262,331 B2 | 8/2007 | Van de Beld et al. | |
| 7,279,018 B2 | 10/2007 | Jakkula et al. | |
| 7,425,657 B1 | 9/2008 | Elliott et al. | |
| 7,465,844 B2 * | 12/2008 | Suyama et al. | 585/242 |
| 7,494,637 B2 * | 2/2009 | Peters et al. | 423/439 |
| 7,638,314 B2 | 12/2009 | Zappi et al. | |
| 8,003,835 B2 * | 8/2011 | Yanik et al. | 585/240 |
| 8,198,493 B1 * | 6/2012 | Livingston et al. | 585/240 |
| 8,252,966 B2 * | 8/2012 | Teal et al. | 585/240 |
| 8,277,643 B2 * | 10/2012 | Huber et al. | 208/400 |
| 8,425,633 B2 * | 4/2013 | Banasiak et al. | 44/605 |
| 2007/0261296 A1 | 11/2007 | Adams et al. | |
| 2008/0006520 A1 | 1/2008 | Badger et al. | |
| 2008/0312476 A1 | 12/2008 | McCall | |
| 2009/0065378 A1 | 3/2009 | Maas | |
| 2009/0165378 A1 | 7/2009 | Agblevor | |
| 2009/0166256 A1 | 7/2009 | Lewis et al. | |
| 2009/0227823 A1 | 9/2009 | Huber et al. | |
| 2009/0229173 A1 | 9/2009 | Gosling | |
| 2009/0250376 A1 | 10/2009 | Brandvold et al. | |
| 2009/0253947 A1 | 10/2009 | Brandvold et al. | |
| 2009/0253948 A1 | 10/2009 | McCall et al. | |
| 2009/0259082 A1 | 10/2009 | Deluga et al. | |

(Continued)

FOREIGN PATENT DOCUMENTS

| | | |
|---|---|---|
| EP | 0718392 | 9/1999 |
| EP | 1719811 | 11/2006 |

(Continued)

OTHER PUBLICATIONS

Search Report and Written Opinion for corresponding PCT Application No. PCT/US2012/022951, filed on Jan. 27, 2012; Applicant: KiOR, Inc.; 12 pages.

(Continued)

*Primary Examiner* — Ellen McAvoy
(74) *Attorney, Agent, or Firm* — Hovey Williams LLP

(57) ABSTRACT

More stable and valuable bio-oil compositions produced from biomasses are provided. Particularly, various embodiments of the present invention provide for a bio-oil composition that has chemical and physical properties that make it more cost effective and useful as a fuel without having to undergo deoxygenating processes such as hydrotreating.

53 Claims, 5 Drawing Sheets

(56) References Cited

U.S. PATENT DOCUMENTS

| | | | |
|---|---|---|---|
| 2009/0294324 | A1 | 12/2009 | Brandvold et al. |
| 2009/0301930 | A1 | 12/2009 | Brandvold et al. |
| 2009/0318737 | A1 | 12/2009 | Luebke |
| 2011/0201855 | A1* | 8/2011 | Marinangeli et al. ......... 585/240 |
| 2011/0258913 | A1* | 10/2011 | Stamires et al. ................ 44/307 |
| 2011/0283601 | A1* | 11/2011 | Ditsch .............................. 44/307 |
| 2012/0023809 | A1* | 2/2012 | Koch et al. ...................... 44/307 |
| 2012/0108860 | A1* | 5/2012 | Daugaard et al. ............... 585/14 |
| 2012/0144730 | A1* | 6/2012 | Stamires et al. ................ 44/307 |
| 2012/0152801 | A1* | 6/2012 | Bozzano et al. ................ 208/17 |
| 2012/0203042 | A1* | 8/2012 | Huber et al. .................. 585/241 |
| 2013/0025187 | A1* | 1/2013 | Kocal et al. ..................... 44/307 |

FOREIGN PATENT DOCUMENTS

| | | |
|---|---|---|
| EP | 2107100 | 10/2009 |
| WO | 2006037368 | 4/2006 |
| WO | 2007128798 | 11/2007 |
| WO | 2007128800 | 11/2007 |
| WO | 2009014859 | 1/2009 |
| WO | 2009126508 | 10/2009 |
| WO | 2010002792 | 1/2010 |
| WO | 2010008686 | 1/2010 |
| WO | 2010033512 | 3/2010 |
| WO | WO2010/068809 | 6/2010 |

OTHER PUBLICATIONS

Bridgwater et al., An overview of fast pyrolysis of biomass, Organic Geochemistry 30 (1999), pp. 1479-1493, Bio-Energy Research Group, Chemical Engineering and Applied Chemistry Department, Aston University, Ontario, Canada.

Ozcimen et al., Production and characterization of bio-oil and biochar from rapeseed cake, Renewable Energy 29 (2004), pp. 779-787, Department of Chemical Engineering, Istanbul Technical University, Istanbul, Turkey.

Hilten, et al "Comparison of Three Accelerated Aging Procedures to Assess Bio-Oil Stability" Fuel 89(2010), 2741-2749.

Ikura, et al "Emulsification of Pyrolysis Derived Bio-Oil in Diesel Fuel" Biomass & BioEnergy 24 (2003) 221-232.

Chiaramonti, et al "Development of Emulsions From Biomass Pyrolysis Liquid and Diesel and Their Use in Engines, Part 1: Emulsion Production" Biomass & BioEnergy 25 (2003) 85-99.

Qi, et al "Review of Biomass Pyrolysis Oil Properties and Upgrading Research", Energy Conversion & Management 48 (2007) 87-92.

Garcia-Perez, et al "Production and Fuel Properties of Fast Pyrolysis Oil/Bio-Diesel Blends" Fuel Processing Technology 91 (2010) 296-305.

Ringer, et al, "Large-Scale Pyrolysis Oil Production: A Technology Assessment and Economic Analysis" NREL Technical Report, NREL/TP-510-37779, Nov. 2006.

Czernik, et al "Stability of Wood Fast Pyrolysis Oil" Biomass and Bioenergy, vol. 7, Nos. 1-6, pp. 187-192, 1994, Great Britain.

Mahinpey, et al "Analysis of Bio-Oil, Biogas, and Biochar From Pressurized Pyrolysis of Wheat Straw Using a Tubular Reactor" Energy & Fuels 2009, 23 2736-2742.

Czernik, et al "Overview of Applications of Biomass Fast Pyrolysis Oil" Energy & Fuels 2004, 18, 590-598.

Oasmaa, et al, "Fast Pyrolysis of Forestry Residue. 3. Storage Stability of Liquid Fuel" Energy & Fuels 2003, 17, 1075-1084.

Diebold, "A Review of the Chemical and Physical Mechanisms of the Storage Stability of Fast Pyrolysis Bio-Oils" NREL/SR-570-27613, Jan. 2000.

Moens, et al. "Study of the Neutralization and Stabilization of a Mixed Hardwood Bio-Oil" Energy & Fuels 2009, 23, 2695-2699.

* cited by examiner

US 8,669,405 B2

STABLE BIO-OIL

FIELD OF THE INVENTION

Embodiments of the present invention relate generally to more stables and valuable bio-oils made from biomasses. Particularly, various embodiments of the present invention provide for a bio-oil composition that has chemical and physical properties that make it more cost effective and useful as a fuel without having to undergo deoxygenating processes such as hydrotreating.

BACKGROUND OF THE INVENTION

With the rising costs and environmental concerns associated with fossil fuels, renewable energy sources have become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful bio-fuels and/or specialty chemicals. Existing biomass conversion processes include, for example, combustion, gasification, slow pyrolysis, fast pyrolysis, liquefaction, and enzymatic conversion. One of the useful products that may be derived from the aforementioned biomass conversion processes is a liquid product commonly referred to as "bio-oil." Bio-oil may be processed into transportation fuels, hydrocarbon chemicals, and/or specialty chemicals.

Despite recent advancements in biomass conversion processes, many of the existing biomass conversion processes produce low-quality bio-oils containing high amounts of oxygen, which are difficult, if not impossible, to separate into various fractions. Due to the high amounts of oxygen present, in the bio-oil, these bio-oils require extensive secondary upgrading in order to be utilized as fuels or for further processing to obtain chemical products.

More specifically, the production of bio-oil by pyrolysis, both fast, and slow, can be problematic. Pyrolysis is characterized by the thermal decomposition of materials in an oxygen-poor or oxygen-free atmosphere (i.e., significantly less oxygen than required for complete combustion). In the past, pyrolysis has referred to slow pyrolysis whose equilibrium products included non-reactive solids (char and ash), liquids (tar and/or pyroligneous liquor), and non-condensable gases.

More recently, it has been recognized that pyrolysis can be carried out through a fast (rapid or flash) pyrolysis method where finely divided feedstock is rapidly heated and the reaction time is kept short, i.e. on the order of seconds. Such fast pyrolysis results in high yields of primary, non-equilibrium liquids and gases (including valuable chemicals, chemical intermediates, hydrocarbon chemicals and bio-fuels).

The non-equilibrium liquids (or bio-oil) produced by fast pyrolysis are suitable as a fuel for clean, controlled combustion in boilers and for use in diesel and stationary turbines. In fact, such bio-oil liquids offer some distinctive advantages for heating and power production over biomass gasification products and direct combustion of the biomass. Some of the advantages of bio-oil are:

Higher energy densities compared to direct combustion of, the raw biomass;
More easily/cost effective to transport and handle than raw biomass or producer gas;
Existing boilers may be used with bio-oil, subject only to retrofitting;
Fewer emissions in boiler use compared to solid fuels due to better control of the combustion process; and
Bio-oil from pyrolysis processes is the least cost liquid bio-fuel for stationary use and its net $CO_2$-balance is better than that of other bio-fuels.

However, besides all those advantages, instability and corrosiveness compared to conventional oil, have precluded a full success of pyrolysis bio-oils. Accordingly, it would be advantageous to develop a pyrolysis derived bio-oil that has improved stability and less corrosiveness than prior art bio-oils without having to undergo hydrotreating or other deoxygenating processes.

SUMMARY

In one embodiment of the present invention, there is provided a thermally stable bio-oil composition derived from a cellulosic biomass, wherein the bio-oil composition has an oxygen content no greater than about 30 weight percent, has a water content of less than about 6 weight percent, has a Conradson Carbon number of less than about 25 weight percent, and has a total acid number no greater than about 30 mgKOH/g. Preferably the bio-oil composition is substantially free of carboxylic acids, and contains less than about 6 weight percent of compounds having a carbonyl group.

In another embodiment of the present invention, there is provided a bio-oil composition derived from a cellulosic biomass wherein the bio-oil composition is produced by a process comprising (a) converting at least a portion of the cellulosic biomass material in an oxygen-poor environment in the presence of a catalyst material at a temperature in the range of from about 200° C. to about 1000° C. to produce a reaction product stream containing the bio-oil composition; and (b) separating the bio-oil composition froth the reaction product stream such that the bio-oil composition (i) has an oxygen content no greater than about 30 weight percent, (ii) has a water content of less than about 6 weight percent, (iii) has a Conradson Carbon number of less than about 25 weight percent, and (iv) has a total acid number no greater than about 30 mgKOH/g, and wherein characteristics (i)-(iv) are achieved without an oxygen-removing hydrotreatment step. Preferably the bio-oil composition is substantially free of carboxylic acids, and contains less than about 6 weight percent of compounds having a carbonyl group.

BRIEF DESCRIPTION OF THE DRAWING FIGURES

Embodiments of the present invention are described in detail below with reference to the attached figures, wherein.

DETAILED DESCRIPTION

Figure 1:
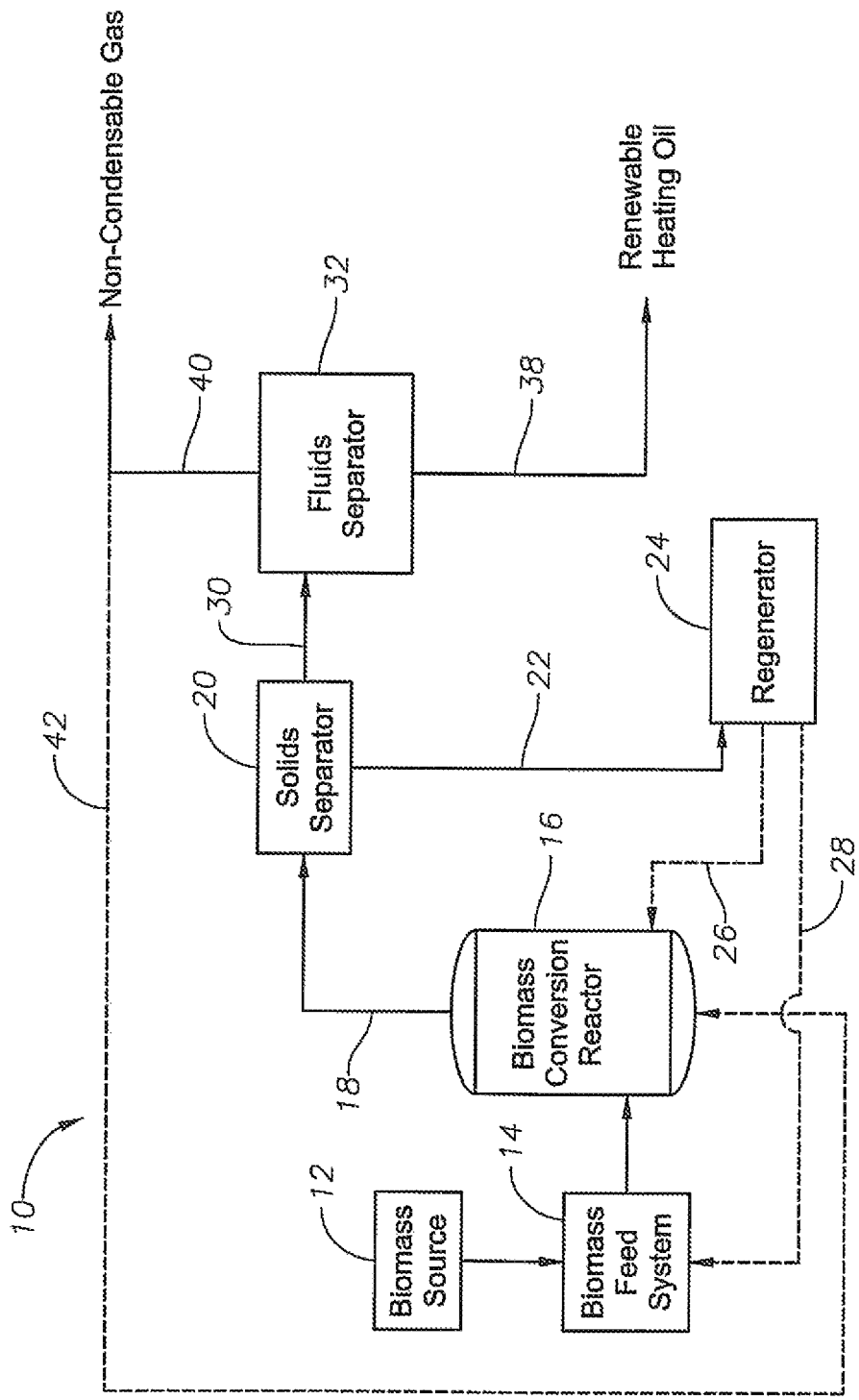
FIG. 1 is a schematic diagram of a biomass conversion, system according to one embodiment of the present invention.

The following detailed description of various embodiments of the invention references FIG. 1, which illustrates a biomass conversion system suitable for use in producing a bio-oil in accordance with the invention. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Pyrolysis as used herein refers to non-catalytic pyrolysis processes. Fast pyrolysis processes are pyrolysis process for converting all or part of the biomass to bio-oil by heating the biomass in an oxygen-poor or oxygen-free atmosphere. The biomass is heated to pyrolysis temperature for a short time compared with conventional pyrolysis process, i.e. less than 10 seconds. Pyrolysis temperatures can be in the range of from about 200° C. to about 1000° C. Often the biomass will be heated in a reactor using an inert heat carrier, such as sand. As used above, the term "oxygen-poor" refers to an atmosphere containing less oxygen than ambient air. In general, the amount of oxygen should be such as to avoid combustion of the biomass material, or vaporized and gaseous products emanating from the biomass material, at the pyrolysis temperature. Preferably the atmosphere is essentially oxygen-free, that is, contains less than about 1 weight percent oxygen.

Biomass catalytic cracking (BCC) as used herein refers to a catalytic pyrolysis, wherein a catalyst is used to help facilitate cracking of the biomass under fast pyrolysis type conditions. Accordingly, in a BCC process a catalyst is used in the reactor to facilitate the conversion of the biomass to bio-oil. The catalyst can be pre-mixed with the biomass before introduction into the reactor or be introduced into the reactor separately. If introduced separately into the reactor a particulate catalyst can be used in place of all or part of the inert heat carrier.

The present invention is directed to bio-oil compositions having chemical and physical properties that result in a particularly stable bio-oil. The bio-oil compositions have a stability that enhances their ability to be transported. Additionally, while the bio-oil compositions are suitable for use as fuel without further processing and in particularly without undergoing a de-oxygenation process such as hydrotreating, their enhanced stability also makes them particularly suitable for further processing (as described below). In particular, the inventive bio-oil compositions have increased thermal stability and lower corrosiveness in comparison to pyrolysis derived bio-oils.

The bio-oil composition of the current invention is a renewable thermally stable bio-oil composition derived from a cellulosic biomass. The bio-oil composition is characterized by having low oxygen content. Further in a preferred embodiment, the oxygen present is in a form resulting in the bio-oil composition having low water content, being substantially free of carboxylic acids and being low in compounds having carbonyl groups.

The bio-oil composition can have a total oxygen content no greater than about 30 weight percent, preferably less than 20, or 15 weight percent and can also include at least about 5, 6, or 7 weight percent oxygen. More preferably, the total oxygen content will be from about 5 weight percent to about 30 weight percent, from 6 weight percent to 15 weight percent or from 7 weight percent to 15 weight percent. The oxygen content for the bio-oil composition indicated herein is on a dry basis; that is without including the oxygen content of any water present in the renewable oil composition.

The low oxygen content can be characterized by low amounts of carboxylic acids and compounds containing carbonyl groups. In a preferred embodiment the bio-oil composition is substantially free of carboxylic acids. Generally, this will mean that carboxylic acids make up less than about 1 weight percent of the bio-oil composition and, preferably, less than 2000 ppm of the weight of the bio-oil composition. Additionally, the amount of compounds having carbonyl groups can be below about 6, 4 or 2 weight percent of the total bio-oil composition.

Additionally, one embodiment the bio-oil composition will have a low water content. This can be characterized by water being present in an amount of less than about 6 weight percent of the total bio-oil composition and, preferably, from 1 to 5 weight percent and more preferably from 1 to 4 weight percent of the total bio-oil composition.

Another characteristic of the bio-oil composition can be a Conradson Carbon number of less than about 25 weight percent, or preferably less than 22 weight percent. Conradson Carbon number is a calculation of the residual carbon content of the oil. It gives an indication of the coke forming tendency of the oil and can be determined by ASTM D189, ASTM D4530, or equivalent methods.

Additionally, the bio-oil composition can have a total acid number (TAN) no greater than about 30 mgKOH/g and preferably less than 20 mgKOH/g or 15 mgKOH/g. The TAN is defined as the amount of base, expressed as mgKOH, necessary to neutralize the acids present in a feedstock. The TAN is a well-known parameter used, to characterize the acidity of hydrocarbonaceous crude oils, and fractions of hydrocarbonaceous crude oils and can be determined by ASTM D664 buffer (pH=11) endpoint.

Also, the content of ash-forming material present in the bio-oil composition should be low. Generally, ash-forming materials are compounds and minerals originally present in the biomass that remain in the bio-oil composition and have a tendency to form ash upon combustion of the bio-oil composition. Generally, in the bio-oil composition of the present invention such solids can comprise unconverted biomass and minerals and other compounds left over from the converted biomass. Additionally, spent, catalyst particles that are not separated in the solids separator 20 can be an ash-forming material. As used herein "ash content" will refer to the content of all the ash-forming materials contained in the bio-oil composition. The ash content of the bio-oil composition should be low, and can be less than about 3000 wt-ppm, 2000 wt-ppm or 1000 wt-ppm.

The present invention can result in much more stable bio-oils than the prior art. In certain embodiments, the bio-oil composition of the present invention will have, a stability parameter less than 30 centipoise per how (cp/h), and preferably no greater than 20 cp/h, no greater than 15 cp/h or no greater than 10 cp/h. The stability parameter characterizes the stability of a bio-oil over time. As used herein, the "stability parameter" of a bio-oil is defined as the slope of a best-fit straight line for a plot of bio-oil viscosity (centipoises) over time (hours), where the plotted viscosity values are determined for samples of the aged bio-oil at 40° C., the aging process is carried out at 90° C. and the samples are taken at the onset of aging (time=0 hours), 8 hours from the onset of aging, 24 hours from the onset of aging, and 48 hours from the onset of aging. Only data points exhibiting a correlation coefficient greater than 0.9 ($R^2>0.9$) are used to determine the stability parameter. Generally, low stability bio-oil has a stability parameter greater than 75 cp/h, intermediate-stability bio-oil has a stability parameter in the range of 30 to 75 cp/h and high-stability bio-oil has a stability parameter of less than 30 cp/h. Additionally, bio-oil with a stability parameter of less than 0.1 cp/h can be classified as ultra-stable bio-oil so that high-stability bio-oil is that with a stability parameter below 30 cp/h but at least 1 cp/h.

Production of the bio-oil composition can be achieved by producing a bio-oil derived from a biomass that is converted in a biomass catalytic cracking (BCC) process in accordance with the invention, particularly a BCC process using a transport fluid bed reactor. Turning now to FIG. 1, it depicts a biomass conversion system 10 that is suitable for producing the bio-oil composition of the current invention. It should be understood that the biomass conversion system shown in FIG. 1 is just one example of a system within which the present invention can be embodied. The present invention may find application in a wide variety of other systems where it is desirable to efficiently and effectively convert a biomass into a bio-oil composition. The exemplary biomass conversion system illustrated in FIG. 1 will now be described in detail.

The biomass conversion system 10 of FIG. 1 includes a biomass source 12 for supplying a biomass feedstock to be converted to bio-oil. The biomass source 12 can be, for example, a hopper, storage bin, railcar, over-the-road trailer, or any other device that may hold or store biomass. The biomass supplied by the biomass source 12 can be in the form of solid particles. The biomass particles can be fibrous biomass materials comprising cellulose. Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice.

As depicted in FIG. 1, the solid biomass particles from the biomass source 12 can be supplied to a biomass feed system 14. The biomass feed system 14 can be any system capable of feeding solid particulate biomass to a biomass conversion reactor 16. While in the biomass feed system 14, the biomass material may undergo a number of pretreatments to facilitate the subsequent conversion reactions. Such pretreatments may include drying, roasting, torrefaction, demineralization, steam explosion, mechanical agitation, and/or any combination thereof.

In one embodiment, it may be desirable to combine the biomass with a catalyst in the biomass feed system 14 prior to introducing the biomass into the biomass conversion reactor 16. Alternatively, the catalyst may be introduced directly into the biomass conversion reactor 16. The catalyst may be fresh and/or regenerated catalyst. The catalyst can, for example, comprise a solid acid, such as a zeolite. Examples of suitable zeolites include ZSM-5, Mordenite, Beta, Ferrierite, and zeolite-Y. Additionally, the catalyst may comprise a super acid. Examples of suitable super acids include sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof. In yet another embodiment, the catalyst can also comprise an alumina, such as alpha-alumina.

It should be noted that solid biomass materials generally contain minerals. It is recognized that some of these, minerals, such as potassium carbonate, can have catalytic activity in the conversion of the biomass material. Even though these minerals are typically present during the chemical conversion taking place, in the biomass conversion reactor 16, they are not considered catalysts.

The biomass feed system 14 introduces the biomass feedstock into a biomass conversion reactor 16. In the biomass conversion reactor 16, biomass is subjected to a conversion reaction that produces bio-oil. The reactor 16 can be any system or device capable of thermochemically converting biomass to bio-oil. The biomass conversion reactor 16 can be, for example, a fluidized bed reactor, a cyclone reactor, an ablative reactor, or a riser reactor.

In one embodiment, the biomass conversion reactor 16 can be a riser reactor and the conversion reaction can be catalytic enhanced fast pyrolysis or biomass catalytic cracking (BCC). As discussed above, the BCC conversion should occur in an oxygen-poor or, preferably, oxygen-free atmosphere. In one embodiment, BCC is carried out in the presence of an inert gas, such as nitrogen, carbon dioxide, and/or steam. Alternatively, the BCC conversion can be carried out in the presence of a reducing gas, such as hydrogen, carbon monoxide, non-condensable gases recycled from the biomass conversion process, and/or any combination thereof.

The BCC conversion process is characterized by short residence times and rapid heating of the biomass feedstock. The residence times of the conversion can be, for example, less than 10 seconds, less than 5 seconds, or less than 2 seconds. The BCC conversion may occur at temperatures between 200 and 1,000° C., between 250 and 800° C., or between 300 and 600° C.

In a particularly preferred embodiment, the catalyst is used as a heat carrier material and introduced into reactor 16 via line 26 at sufficient temperature to insure that the reaction mixture reaches a temperature between 200 and 1,000° C., between 250 and 800° C., or between 300 and 600° C. In this embodiment, rapid heating of the solid biomass material can generally be accomplished by providing the solid, biomass material in the form of particles having a low mean particle diameter. Preferably, the mean particle diameter of the biomass is less than about 2000 μm, and more preferably less than about 1.000 μm. The pretreatment of the biomass material can help achieve the desired particle size.

Referring again to FIG. 1, the conversion effluent 18 exiting the biomass conversion reactor 16 generally comprises gas, vapors, and solids. As used herein, the vapors produced during the conversion reaction may interchangeably be referred to as "bio-oil," which is the common name for the vapors when condensed into their liquid state. In the case of a BCC process, the solids in the conversion effluent 18 generally comprise particles of char, ash, unconverted portions of biomass and/or spent catalyst. Because such solids (particularly the unconverted biomass and spent catalyst) can contribute to the tendency of the bio-oil to form ash, it is particularly desirable to remove the solids so that bio-oil is essentially solids free, preferably having an ash content (solids content) of less than about 3000 ppm, 2000 ppm or 1000 ppm.

As depicted in FIG. 1, the conversion effluent 18 from the biomass conversion reactor 16 can be introduced into a solids separator 20. The solids separator 20 can be any conventional device capable of separating solids from gas and vapors such as, for example, a cyclone separator or a gas filter. The solids separator 20 removes a substantial portion of the solids (e.g., spent catalysts, char, and/or heat carrier solids) from the conversion effluent 18. The solid particles 22 recovered in the solids separator 20 can be introduced into a regenerator 24 for regeneration, typically by combustion. After regeneration, at least a portion of the hot regenerated solids can be introduced directly into the biomass conversion reactor 16 via line 26. Alternatively or additionally, the hot, regenerated solids can be directed via line 28 to the biomass feed system 14 for combination with the biomass feedstock prior to introduction into the biomass conversion reactor 16.

The substantially solids-free fluid stream 30 exiting the solids separator 20 can then be introduced into a fluids separator 32. It is preferred and an advantage of the current invention that the bio-oil contained in stream 30 and, entering the fluids separator 32 has not previously been subjected to a deoxygenating process such as, for example, hydrotreating. Within fluids separator 32, non-condensable gas is separated from the bio-oil. The fluids separator 32 can be any system capable of separating the bio-oil contained in stream 30 from the non-condensable gas. Suitable systems to be used as the fluids separator 32 include, for example, systems for affecting separation by fractional distillation, heated distillation, extraction, membrane separation, partial condensation, and/or non-heated distillation. As shown in FIG. 1, non-condensable gases 40 removed from the fluids separator 32 may be, optionally, recycled via lines 40 and 42 to the biomass conversion reactor 16 for use as a lift gas.

The renewable bio-oil composition is removed from fluids separator 32 via line 38. It is a distinct advantage of the current invention that the bio-oil 32 does not need to be treated with an oxygen removing process, such as hydrotreatment, to achieve the above-defined composition. The cost associated with hydrotreatment process and the necessity to hydrotreat pyrolysis derived bio-oil before it is suitable for use as a fuel renders pyrolysis bio-oils uneconomical.

The bio-oil 32 may be further processed to obtain final products, both chemicals and fuels. In the case of chemicals, physical separation techniques are mainly used for the recovery of individual or family compounds. Suitable thermal stability is required for this processing. The bio-oil composition of the current invention exhibits high thermal stability. Making it suitable for such processing.

EXAMPLES

Stability Determination

Stability was assessed for samples of bio-oil based on changes in viscosity using an accelerated thermal stability test based on the observations of Czernik et al. as reported in Czernik, S.; Johnson, D. K. and Black, S. *Stability of wood fast pyrolysis oil*. Biomass and Bioenergy 1994. 7 (1-6), 187-192. Czernik et al. illustrates that viscosity changes for bio-oil stored 12 weeks at 37° C. corresponds to 6 hours at 90° C. and, hence, that viscosity changes for bio-oil stored 1 year at 37° C. corresponds to 24 hours at 90° C. The accelerated thermal stability test used in these examples comprised heating the samples to 90° C. and holding the samples at that temperature for 48 hours. Test amounts were taken from the samples at 0, 8, 24 and 48 hours and viscosity measurements were taken with the test amount temperature being at 40° C. Viscosity was measured using a modified version of ASTM D2983 using a higher temperature than standard due to the high viscosity of bio-oil at low temperature. Viscosity was measured at 40° C. using a Brookfield viscometer. As indicated above, the increase in viscosity under these conditions correlates with room temperature storage such that 24 hours of testing time at 90° C. is equal to the change in a year at near room temperature storage. The accelerated thermal stability test correlates well with the chemical changes in, the liquid, associated to polymerization or condensation reactions. (See also, Oasmaa, A. and Kuoppala, E. *Fast pyrolysis of forestry residue. 3. Storage stability of liquid fuel*. Energy and Fuels 2003, 17 (4), 1075-85.). For comparison, pyrolysis oils submitted to this accelerated thermal stability test have all shown a 100% increase in viscosity after eight hours (as reported in Czernik et al.).

In the following examples the stability parameter or change in viscosity in centipoises (cp) per unit time in hours (h) was evaluated as the slope of a plot of viscosity vs. time and is used as a measure of stability as defined in the previous paragraphs.

Example 1

Twelve bio-oil samples were produced from the conversion of Southern Yellow Pine particles, in two different scale units, namely a pilot plant unit and a semi-commercial (demonstration) unit. The bio-oil samples widely differ in the range of exhibited properties. The samples were produced by biomass catalytic cracking in a riser reactor operated at a reactor outlet temperature of about 500 to 650° C. Some of the characteristics of the samples are indicated in Table 1.

TABLE 1

|  | Oxygen (wt. %) | H$_2$O (wt %) | Carboxylic acids (wt %) | Carbonyl compounds (wt %) | Conradson Carbon (wt %) | TAN (mgKOH/g) |
|---|---|---|---|---|---|---|
| Pilot Plant Bio-oils |  |  |  |  |  |  |
| Sample 1 | 11 | 3.5 | N/D | 0.2 | 12.7 | 10.7 |
| Sample 2 | 16 | 4.8 | N/D | 5.7 | 20.5 | 40.9 |
| Sample 3 | 19 | 5.4 | 0.59 | 6.2 | 24.2 | 31.1 |
| Sample 4 | 22 | 8.2 | 0.8 | 16.8 | 25.4 | 53.8 |
| Demo Unit Bio-oils |  |  |  |  |  |  |
| Sample 5 | 13.2 | 3.7 |  |  |  | 11.4 |
| Sample 6 | 16.2 | 5.3 |  |  |  | 46.7 |
| Sample 7 | 13.2 | 2.6 | 0.28 | 4.71 | 23.7 | 12.7 |
| Sample 8 | 16.2 | 7.9 | 3.74 | 8.82 |  | 43.0 |
| Sample 9 | 16.4 | 5.9 | 4.66 | 10.13 | 28.6 | 55.0 |
| Sample 10 | 20 | 6.0 | 5.12 | 9.40 |  | 43.6 |
| Sample 11 | 19.7 | 6.7 | 4.45 | 10.93 |  | 47.2 |
| Sample 12 | 16.6 | 6.7 | 4.94 | 11.47 | 28.4 | 47.6 |

Figure 2:
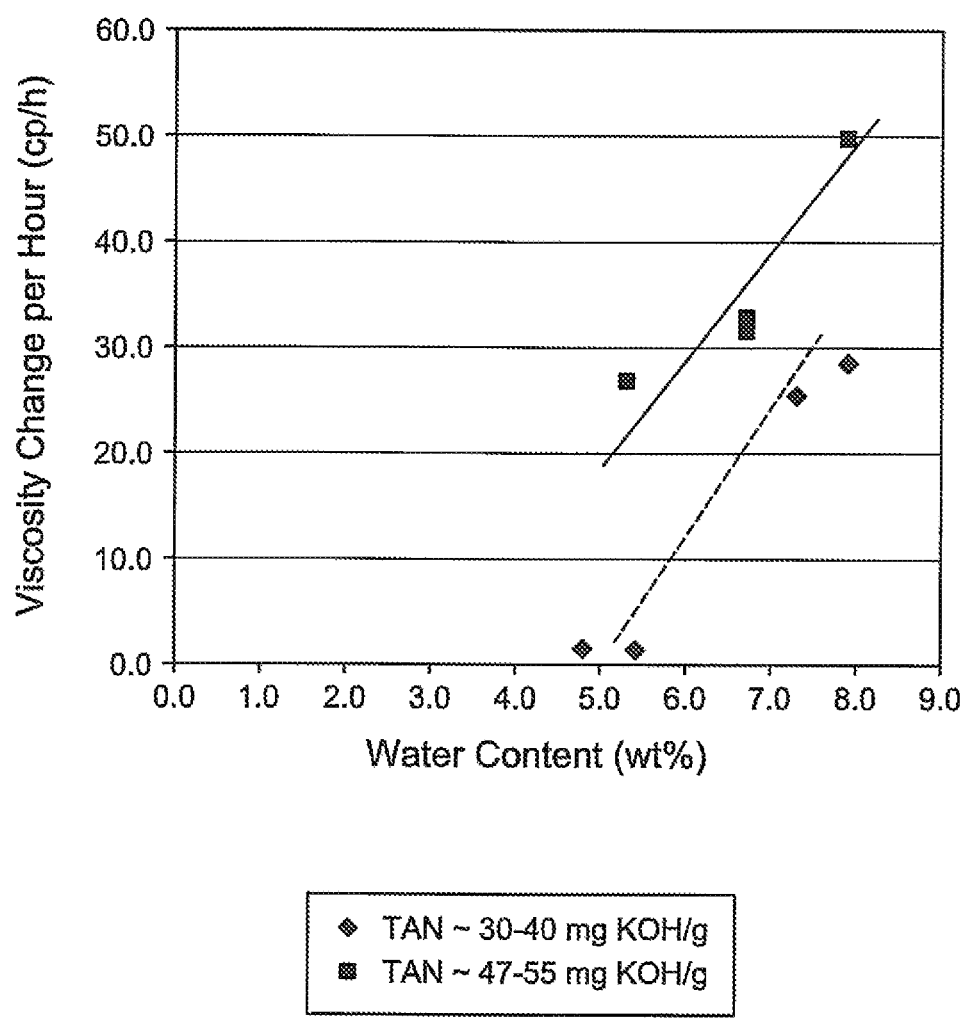
FIG. 2 is a graph illustrating the stability parameter of bio-oil samples having differing water content.

The above samples were, tested for stability using the above described accelerated thermal stability test and the effect of the presence of water on the stability parameter of bio-oil of the present invention is shown in FIG. 2. The larger the viscosity change per hour, the higher the instability becomes. Two set of samples were chosen within two ranges of TAN values. Said sets of samples showed that an increase in water content increases instability. Comparison of the stability parameter of the two sets indicates that the minimum water content that minimizes stability is slightly different. In other words, water affects stability but is not the only factor.

Figure 3:
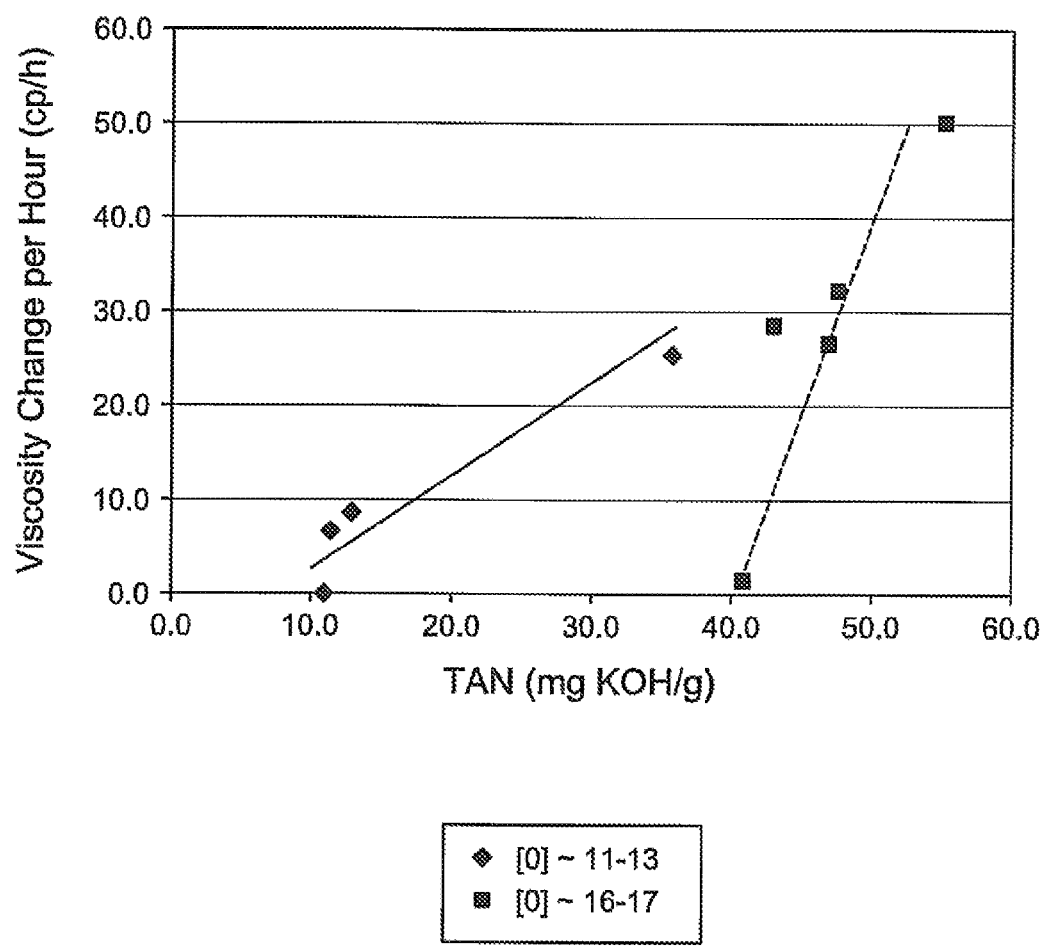
FIG. 3 is a graph illustrating the stability parameter of bio-oil samples having differing TAN wherein the samples fall into groups of two different oxygen content ranges.

The effect of TAN on the stability parameter of bio-oil of the present invention is shown in FIG. 3. The larger the viscosity change per hour, the higher the instability becomes. Two set of samples were chosen within two closed ranges of oxygen content. Said sets of samples showed that an increase in TAN values increases instability, but this increase differs for samples of different oxygen content. Comparison of the stability parameter of the two, sets indicates that the minimum value of TAN that minimizes stability is different and, while TAN also affects stability, it is not the only factor.

Figure 4:
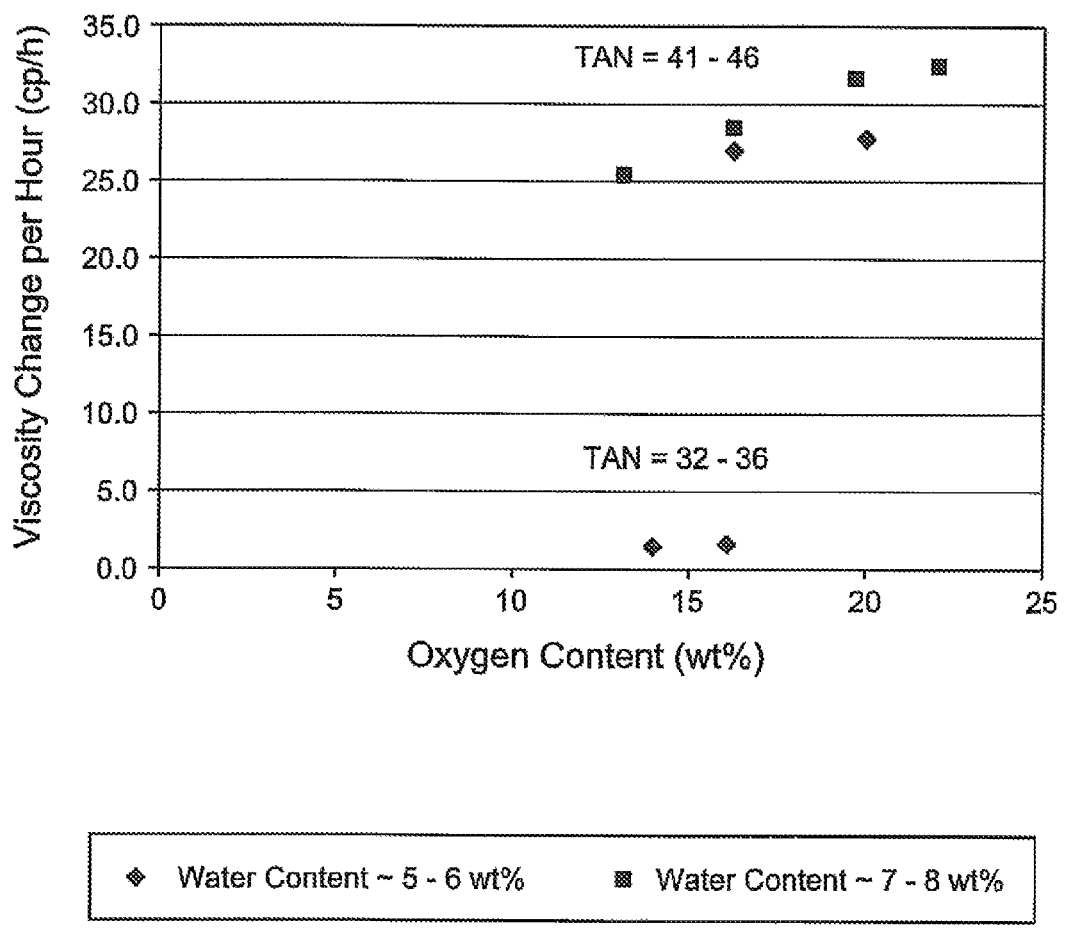
FIG. 4 is a graph illustrating the stability parameter of bio-oil samples having differing content of oxygen wherein the samples fall into groups of two different TAN ranges and water content.

The effect of the oxygen content on the stability parameter of bio-oil of the present invention is shown in FIG. 4. The larger the viscosity change per hour, the higher the instability becomes. Two sets of samples were chosen within two closed ranges of TAN values and water content. The sets of samples showed that an increase in the oxygen content increases instability, but two different trends are observed separating the samples by a gap set by the TAN ranges. The samples containing less than 6 weight percent water showed good stability, but only if TAN was below 36. On the other hand, samples with: a) more than 7 weight percent water or b) with less than 6 weight percent water and exhibiting a higher TAN (41-46), showed very high instability, for equivalent oxygen content. A clear effect of the oxygen content on stability is shown in FIG. 4, however other properties also affects stability besides oxygen content.

Example 2

Ten of the bio-oil samples produced as described in Example 1 were subjected to the accelerated thermal stability test in order to establish the effect of both carbonylic and carboxylic compounds.

Figure 5:
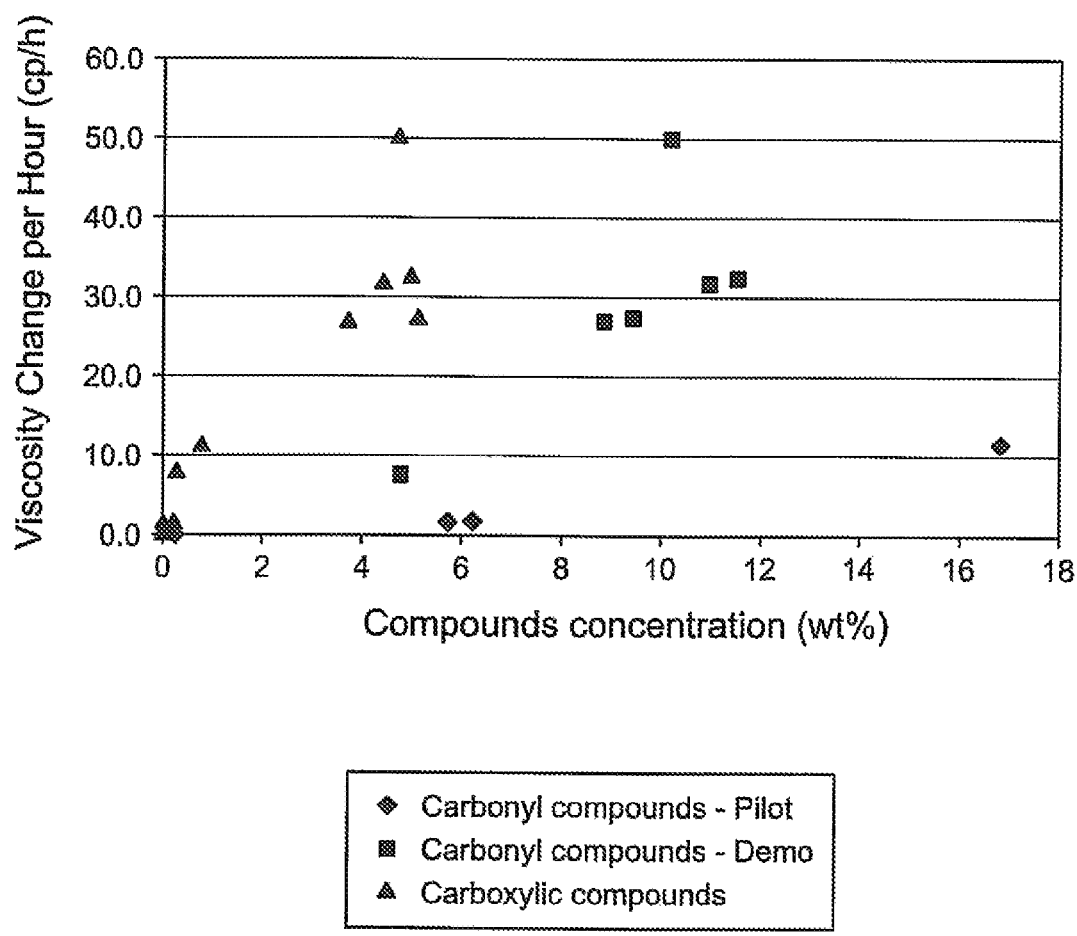
FIG. 5 is a graph illustrating the stability parameter of bio-oil samples having differing concentrations of carbonyl compounds and carboxylic compounds.

The stability parameter was assessed for the ten samples. The results of the stability test are illustrated in FIG. 5. FIG. 5 clearly demonstrates the high stability of those bio-oil samples of the present invention that contain no greater than around 6 weight percent compounds having carbonyl moieties. Additionally, FIG. 5 illustrates that compounds with concentrations of carboxylic acids less than 1 weight percent have higher stability than those with greater carboxylic acid concentrations.

Example 3

Six additional bio-oil samples produced as described in Example 1 were subjected to the accelerated thermal stability test in order to establish the effect of changing the conditions of the biomass conversion process trying to keep the oxygen content of the product below 15%. Ultra-stable bio-oils were obtained when conditions were optimized. The results are illustrated in Table 2.

TABLE 2

| Sample | [O] (wt %) | H$_2$O (wt %) | TAN (mgKOH/g) | Stability Parameter (cps/h) |
|---|---|---|---|---|
| Sample 13 | 9 | 3.4 | 3.9 | 0.13 |
| Sample 14 | 12 | 2.9 | 3.5 | 0.33 |
| Sample 15 | 14 | 6.6 | 5 | 0.57 |
| Sample 16 | 10 | 3.2 | 9.4 | 0.26 |
| Sample 17 | 14 | 3.9 | 20.39 | 0.93 |
| Sample 18 | 14.5 | 5.1 | 16 | 0.41 |

While the technology has been particularly shown and described with reference to specific embodiments, it should be understood by those skilled in the art that various changes in form and detail may be made without departing, from the spirit and scope of the technology as defined by the appended claims.

As used herein, the terms "a," "an," "the," and "said" means one or more.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or elements recited after the term, where the element or elements listed after the transition term are not necessarily the only elements that makeup of the subject.

As used herein, the terms "containing," "contains," and "contain" have the same open-ended meaning as "comprising," "comprises," and "comprise," provided below.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on, the Doctrine of Equivalents to determine and assess the reasonably fair scope of the present invention as it pertains to any apparatus not materially departing from but outside the literal scope of the invention as set forth in the following claims.

What is claimed is:

1. A thermally stable bio-oil composition derived from a cellulosic biomass, wherein said bio-oil composition:
   (a) has an oxygen content no greater than about 30 weight percent,
   (b) has a water content of less than about 6 weight percent,
   (c) has a Conradson Carbon number of less than about 25 weight percent, and
   (d) has a total acid number no greater than about 30 mgKOH/g.

2. The bio-oil composition of claim 1 wherein said oxygen content of said bio-oil composition is from 5 weight percent to 30 weight percent.

3. The bio-oil composition of claim 2 wherein said oxygen content of said bio-oil composition is from 6 weight percent to 20 weight percent.

4. The bio-oil composition of claim 3 wherein said oxygen content of said bio-oil composition is from 7 weight percent to 15 weight percent.

5. The bio-oil composition of claim 1 wherein said Conradson Carbon number is less than 22 weight percent.

6. The bio-oil composition of claim 1 having a total acid number of less than 20 mgKOH/g.

7. The bio-oil composition of claim 1 wherein said water content of the bio-oil composition is from 1 to 5 weight percent.

8. The bio-oil composition of claim 1 wherein said water content of the bio-oil composition is from 1 to 4 weight percent.

9. The bio-oil composition of claim 1 having the further characteristic of being substantially free of carboxylic acids.

10. The bio-oil composition of claim 9 wherein said carboxylic acid content is below about 2000 ppm.

11. The bio-oil composition of claim 1 containing less than about 6 weight percent of compounds having a carbonyl group.

12. The bio-oil composition of claim 11 containing less than about 4 weight percent of compounds having a carbonyl group.

13. The bio-oil composition, of claim 1 wherein said bio-oil composition is derived from the thermochemical conversion of said cellulosic biomass in the presence of a catalyst.

14. The bio-oil composition of claim 13 wherein said bio-oil composition is derived from said cellulosic biomass without an oxygen-removing hydrotreatment step.

15. The bio-oil composition of claim 14 wherein said cellulosic biomass is a lignocellulosic biomass.

16. The bio-oil composition of claim 1 wherein said bio-oil composition is derived from said cellulosic biomass without an oxygen-removing hydrotreatment step.

17. The bio-oil composition of claim 1 wherein said cellulosic biomass is a lignocellulosic biomass.

18. The bio-oil composition of claim 1 having a stability parameter of less than 30 cp/h.

19. The bio-oil composition of claim 1 having a stability parameter no greater than 15 cp/h.

20. The bio-oil composition of claim 1 having a stability parameter less than 1 cp/h.

21. A thermally stable bio-oil composition derived from a cellulosic biomass, wherein said bio-oil composition:
   (a) has an oxygen content of from 7 to 15 weight percent,
   (b) has a water content from 1 to 4 weight percent,
   (c) has a carboxylic acid content of less about 2000 ppm,
   (d) contains less than about 4 weight percent of compounds having a carbonyl group,
   (e) has a Conradson Carbon number of less than 22 weight percent, and
   (f) has a total acid number of less than about 20 mgKOH/g.

22. The bio-oil composition of claim 21 wherein said bio-oil composition is derived from the thermochemical conversion of said cellulosic biomass in the presence of a catalyst.

23. The bio-oil composition of claim 22 wherein said bio-oil composition is derived from said cellulosic biomass without an oxygen-removing hydrotreatment step.

24. The bio-oil composition of claim 23 wherein said cellulosic biomass is a lignocellulosic biomass.

25. The bio-oil composition of claim 24 having a stability parameter of less than 30 cp/h.

26. The bio-oil composition of claim 25 wherein the stability parameter is no greater than 15 cp/h.

27. The bio-oil composition of claim 26 wherein the stability parameter is less than 1 cp/h.

28. A bio-oil composition derived from a cellulosic biomass wherein said bio-oil composition is produced by a process comprising:
   (a) converting at least a portion of said cellulosic biomass material in an oxygen-poor environment in the presence of a catalyst material at a temperature in the range of from about 200° C. to about 1000° C. to produce a reaction product stream containing said bio-oil composition; and
   (b) separating said bio-oil composition from said reaction product stream such that said bio-oil composition (i) has an oxygen content no greater than about 30 weight percent, (ii) has a water content of less than about 6 weight percent, (iii) has a Conradson Carbon number of less than about 25 weight percent, and (iv) has a total acid number no greater than about 30 mgKOH/g, and wherein characteristics (i)-(iv) are achieved without an oxygen-removing hydrotreatment step.

29. The bio-oil composition of claim 28 wherein said cellulosic biomass is a lignocellulosic biomass.

30. The bio-oil composition of claim 28 wherein the conversion of step (a) occurs in less than 10 seconds.

31. The bio-oil composition of claim 28 wherein said oxygen content of said bio-oil composition is from 5 weight percent to 30 weight percent.

32. The bio-oil composition of claim 31 wherein said oxygen content of said bio-oil composition is from 6 weight percent to 20 weight percent.

33. The bio-oil composition of claim 32 wherein said oxygen content of said bio-oil composition is from 7 weight percent to 15 weight percent.

34. The bio-oil composition of claim 28 wherein said Conradson Carbon number is less than 22 weight percent.

35. The bio-oil composition of claim 28 having a total acid number of less than 20 mgKOH/g.

36. The bio-oil composition of claim 28 wherein said water content of said bio-oil composition is from 1 to 5 weight percent.

37. The bio-oil composition of claim 36 wherein said water content of said bio-oil composition is from 1 to 4 weight percent.

38. The bio-oil composition of claim 28 having the further characteristic of being substantially free of carboxylic acids.

39. The bio-oil composition of claim 38 wherein said carboxylic acid content is below about 2000 ppm.

40. The bio-oil composition of claim 28 containing less than about 6 weight percent of compounds having a carbonyl group.

41. The bio-oil composition of claim 40 containing less than about 4 weight percent of compounds having a carbonyl group.

42. The bio-oil composition of claim 28 having a stability parameter of less than 30 cp/h.

43. The bio-oil composition of claim 42 wherein the stability parameter is no greater than 15 cp/h.

44. The bio-oil composition of claim 43 wherein, the stability parameter is less than 1 cp/h.

45. A bio-oil composition derived from a lignocellulosic biomass wherein said bio-oil composition is produced by a process comprising:
   (a) converting in less than 10 seconds at least a portion of said lignocellulosic biomass material in an oxygen-poor environment in the presence of a catalyst material at a temperature in the range of from about 200° C. to about 1000° C. to produce a reaction product stream containing said bio-oil composition; and
   (b) separating said bio-oil composition from said reaction product stream such that said bio-oil composition (i) has an oxygen content from 7 to 15 weight percent, (ii) has a water content of from 1 to 4 weight percent, (iii) has a carboxylic acid content of less than about 2000 ppm, (iv) contains less than about 4 weight percent of compounds having a carbonyl group, (v) has a Conradson Carbon number of less than 22 weight percent, and (vi) has a total acid number of less than about 20 mgKOH/g, (vii) has a stability parameter of less than 1 cp/h and wherein characteristics (i)-(vii) are achieved without an oxygen-removing hydrotreatment step.

46. A thermally stable bio-oil composition derived from a cellulosic biomass, wherein said bio-oil composition has a stability parameter of less than 30 cp/hr.

47. The bio-oil composition of claim 46 wherein said stability parameter is no greater than 20 cp/hr.

48. The bio-oil composition of claim 46 wherein said stability parameter is no greater than 15 cp/hr.

49. The bio-oil composition of claim 46 wherein, said stability parameter is no greater than 10 cp/hr.

50. The bio-oil composition of claim 49, wherein said bio-oil composition:
   (a) has an oxygen content no greater than about 30 weight percent,
   (b) has a water content of less than about 6 weight percent,
   (c) has a Conradson Carbon number of less than about 25 weight percent, and
   (d) has a total acid number no greater than about 30 mgKOH/g.

51. The bio-oil composition of claim 49, wherein said bio-oil composition:
   (a) has an oxygen content of from 7 to 15 weight percent,
   (b) has a water content from 1 to 4 weight percent,
   (c) has a carboxylic acid content of less about 2000 ppm,
   (d) contains less than about 4 weight percent of compounds having a carbonyl group,
   (e) has a Conradson Carbon number of less than 22 weight percent, and
   (f) has a total acid number of less than about 20 mgKOH/g.

52. The bio-oil composition of claim 46 wherein the stability parameter is less than 1 cp/h.

53. The bio-oil composition of claim 52, wherein said bio-oil composition:
   (a) has an oxygen content of from 7 to 15 weight percent,
   (b) has a water content from 1 to 4 weight percent,
   (c) has a carboxylic acid content of less about 2000 ppm,
   (d) contains less than about 4 weight percent of compounds having a carbonyl group,
   (e) has a Conradson Carbon number of less than 22 weight percent, and
   (f) has a total acid number of less than about 20 mgKOH/g.

* * * * *